(12) United States Patent
Wu et al.

(10) Patent No.: US 9,241,167 B2
(45) Date of Patent: Jan. 19, 2016

(54) METADATA ASSISTED VIDEO DECODING

(75) Inventors: Yongjun Wu, Bellevue, WA (US);
Shyam Sadhwani, Bellevue, WA (US);
Naveen Thumpudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 13/399,769

(22) Filed: Feb. 17, 2012

(65) Prior Publication Data

US 2013/0215978 A1    Aug. 22, 2013

(51) Int. Cl.
  *H04N 7/26*    (2006.01)
  *H04N 19/157*  (2014.01)
  *H04N 19/12*   (2014.01)
  *H04N 19/46*   (2014.01)

(52) U.S. Cl.
  CPC ............ *H04N 19/157* (2014.11); *H04N 19/12* (2014.11); *H04N 19/46* (2014.11)

(58) Field of Classification Search
  None
  See application file for complete search history.

(56) References Cited

U.S. PATENT DOCUMENTS

| | | | | |
|---|---|---|---|---|
| 6,311,204 | B1* | 10/2001 | Mills ............................ | 718/100 |
| 7,439,883 | B1  | 10/2008 | Moni et al. | |
| 2003/0063676 | A1* | 4/2003 | Prakash et al. ........... | 375/240.27 |
| 2004/0196902 | A1* | 10/2004 | Faroudja .................... | 375/240.1 |
| 2005/0123274 | A1* | 6/2005 | Crinon et al. ................. | 386/69 |
| 2005/0152448 | A1* | 7/2005 | Crinon et al. ............ | 375/240.01 |
| 2005/0259729 | A1* | 11/2005 | Sun .......................... | 375/240.1 |
| 2006/0013305 | A1* | 1/2006 | Sun .......................... | 375/240.12 |
| 2006/0126726 | A1  | 6/2006 | Lin et al. | |
| 2006/0215754 | A1  | 9/2006 | Buxton et al. | |
| 2007/0121728 | A1* | 5/2007 | Wang et al. .......... | H04N 19/563 375/240.18 |
| 2007/0183508 | A1* | 8/2007 | Kudo .................... | H04N 19/176 375/240.25 |
| 2008/0189660 | A1* | 8/2008 | Nakagawa ..................... | 715/840 |
| 2009/0002379 | A1  | 1/2009 | Baeza et al. | |
| 2009/0003446 | A1  | 1/2009 | Wu et al. | |
| 2009/0003447 | A1  | 1/2009 | Christoffersen et al. | |
| 2009/0196352 | A1* | 8/2009 | Stein et al. ............... | 375/240.15 |

(Continued)

FOREIGN PATENT DOCUMENTS

| | | |
|---|---|---|
| CN | 101115195 | 1/2008 |
| CN | 101577110 | 11/2009 |

(Continued)

OTHER PUBLICATIONS

Wiegand, Thomas, and Gary J. Sullivan. "The H. 264/AVC video coding standard." IEEE Signal Processing Magazine 24.2 (2007), pp. 148-153.*

(Continued)

*Primary Examiner* — Tracy Li
*Assistant Examiner* — Mohammad J Rahman
(74) *Attorney, Agent, or Firm* — Sunah Lee; Judy Yee; Micky Minhas (57) ABSTRACT

A video decoder is disclosed that uses metadata in order to make optimization decisions. In one embodiment, metadata is used to choose which of multiple available decoder engines should receive a video sequence. In another embodiment, the optimization decisions can be based on length and location metadata information associated with a video sequence. Using such metadata information, a decoder engine can skip start-code scanning to make the decoding process more efficient. Also based on the choice of decoder engine, it can decide whether emulation prevention byte removal shall happen together with start code scanning or not.

20 Claims, 8 Drawing Sheets

(56) References Cited

U.S. PATENT DOCUMENTS

| | | | |
|---|---|---|---|
| 2009/0228601 A1* | 9/2009 | Tseng et al. | 709/231 |
| 2009/0305680 A1* | 12/2009 | Swift et al. | 455/414.1 |
| 2009/0323813 A1 | 12/2009 | De Faria et al. | |
| 2010/0027974 A1* | 2/2010 | Ansari | 386/124 |
| 2010/0046631 A1 | 2/2010 | Raveendran | |
| 2010/0135383 A1 | 6/2010 | Zhao et al. | |
| 2010/0189182 A1 | 7/2010 | Hannuksela | |
| 2010/0195721 A1 | 8/2010 | Wu et al. | |
| 2011/0058792 A1 | 3/2011 | Towner et al. | |
| 2011/0080425 A1* | 4/2011 | Kim et al. | 345/629 |
| 2011/0225417 A1* | 9/2011 | Maharajh et al. | 713/150 |
| 2011/0261885 A1* | 10/2011 | de Rivaz | 375/240.16 |
| 2012/0044153 A1* | 2/2012 | Arrasvuori et al. | 345/173 |
| 2012/0066589 A1* | 3/2012 | Santos et al. | 715/255 |
| 2012/0147141 A1* | 6/2012 | Sasaki et al. | 348/43 |
| 2012/0236939 A1* | 9/2012 | Filippini et al. | 375/240.14 |
| 2012/0317305 A1* | 12/2012 | Einarsson et al. | 709/231 |
| 2013/0007827 A1* | 1/2013 | Adam et al. | 725/112 |
| 2013/0121669 A1* | 5/2013 | Zdepski | 386/343 |
| 2013/0128947 A1* | 5/2013 | Fryer et al. | 375/240.01 |
| 2013/0148947 A1* | 6/2013 | Glen et al. | 386/355 |
| 2013/0156101 A1* | 6/2013 | Lu et al. | 375/240.12 |
| 2013/0166580 A1* | 6/2013 | Maharajh et al. | 707/758 |
| 2013/0188685 A1* | 7/2013 | Sasai | H04N 19/176 375/340.02 |
| 2013/0195183 A1* | 8/2013 | Zhai et al. | 375/240.12 |
| 2013/0235152 A1* | 9/2013 | Hannuksela et al. | 348/43 |
| 2013/0308707 A1* | 11/2013 | Raveendran et al. | 375/240.24 |

FOREIGN PATENT DOCUMENTS

| | | |
|---|---|---|
| CN | 101986708 | 3/2011 |
| KR | 10-2010-0000066 | 1/2010 |
| KR | 10-2010-0109333 | 10/2010 |

OTHER PUBLICATIONS

International Search Report and Written Opinion for PCT/US2013/026004, dated Jun. 2, 2013, 9 pages.

Chen et al., "Implementation of H.264 Encoder and Decoder on Personal Computers," *Journal of Visual Communication and Image Representation*, 2006, 19 pages.

"First Office Action and Search Report issued in Chinese Patent Application No. 201380009666.7," Mailed Jun. 2, 2015, 14 pages.

Extended European Search Report for EP 13 74 9713, dated Sep. 4, 2015, 8 pages.

Qiu et al., "An Architecture for Programmable Multi-core IP Accelerated Platform with an Advanced Application of H.264 Codec Implementation," *Journal of Signal Processing Systems*, vol. 57, No. 2, Nov. 2009, pp. 123-137.

Sullivan, "DirectX Video Acceleration Specification for Windows Media Video v8, v9 and vA Decoding (Including SMPTE 421M 'Vc-1')," Aug. 2010, 102 pages.

Sullivan, "DirectX Video Acceleration Specification for H.264/AVC Decoding," Dec. 2010, 66 pages.

\* cited by examiner

METADATA ASSISTED VIDEO DECODING

FIELD

The present application relates generally to decoding and, particularly, to optimizing decoding using metadata from an encoded video sequence with a file container.

BACKGROUND

Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Over the last two decades, various video codec standards have been adopted, including the H.261, H.262 (MPEG-2) and H.263 standards and the MPEG-1 and MPEG-4 standards. More recently, the H.264 standard (sometimes referred to as AVC or 14496-10) and VC-1 standard have been adopted. Next generation standard of HEVC is in development. For additional details, see representative versions of the respective standards. A video codec standard typically defines options for the syntax of an encoded video bitstream, detailing parameters that are in the bitstream for a video sequence when particular features are used in encoding and decoding. In many cases, a video codec standard also provides details about the decoding operations a decoder can perform to achieve correct results in decoding.

For modern decoding, a graphics processing unit (GPU) can be used. A GPU is a specialized electronic circuit designed to rapidly manipulate and alter memory in such a way so as to accelerate the building of images in a frame buffer intended for output to a display. GPUs are used in embedded systems, mobile phones, personal computers, workstations, game consoles, etc. Modern GPUs are very efficient at manipulating computer graphics, and their highly parallel structure makes them more effective than general-purpose CPUs for algorithms where processing of large blocks of data is done in parallel.

Although fast, most GPUs are not designed to handle videos encoded with Arbitrary Slice Order (ASO) and/or Flexible Macro-block Order (FMO). Video encoded using such algorithms is typically processed using a decoder designed to handle baseline profiles, like a CPU. Instead, GPUs are generally designed to handle a video sequence having a main profile and higher profiles. Unfortunately, many H.264/AVC encoders produce baseline bitstreams, which are actually conformant to main profile, but have a constraint flag incorrectly set. This incorrectly set flag makes H.264/AVC decoders treat those clips as pure baseline including ASO or FMO, even though such algorithms may not have been used.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A video decoder is disclosed that uses metadata of an encoded video sequence in order to make optimization decisions. For example, in one embodiment, metadata can be used to choose which decoder engine can receive a video sequence. Multiple decoder engines can be available in a decoder, such as a one that can handle baseline profile (e.g., a CPU) and one that cannot (e.g., a GPU), but which in general is more efficient. By using the metadata to choose the most efficient decoder engine, an optimized decoder is realized.

In another embodiment, the optimization decisions can be based on length and location metadata information associated with a video sequence. Using such metadata information, a decoder engine can skip start-code scanning to make the decoding process more efficient.

In yet another embodiment, an emulation prevention byte can be removed dynamically while a bitstream parser decodes slice headers, a sequence parameter set (SPS), a picture parameter set (PPS) and supplemental enhancement information (SEI). When the network access layer unit (NALU) length information is available, hardware accelerated decoding can completely skip start code scanning, and send NALU's one by one directly to hardware.

The foregoing and other objects, features, and advantages of the invention will become more apparent from the following detailed description, which proceeds with reference to the accompanying figures.

DETAILED DESCRIPTION

I. Example Computing Environment.

Figure 1:
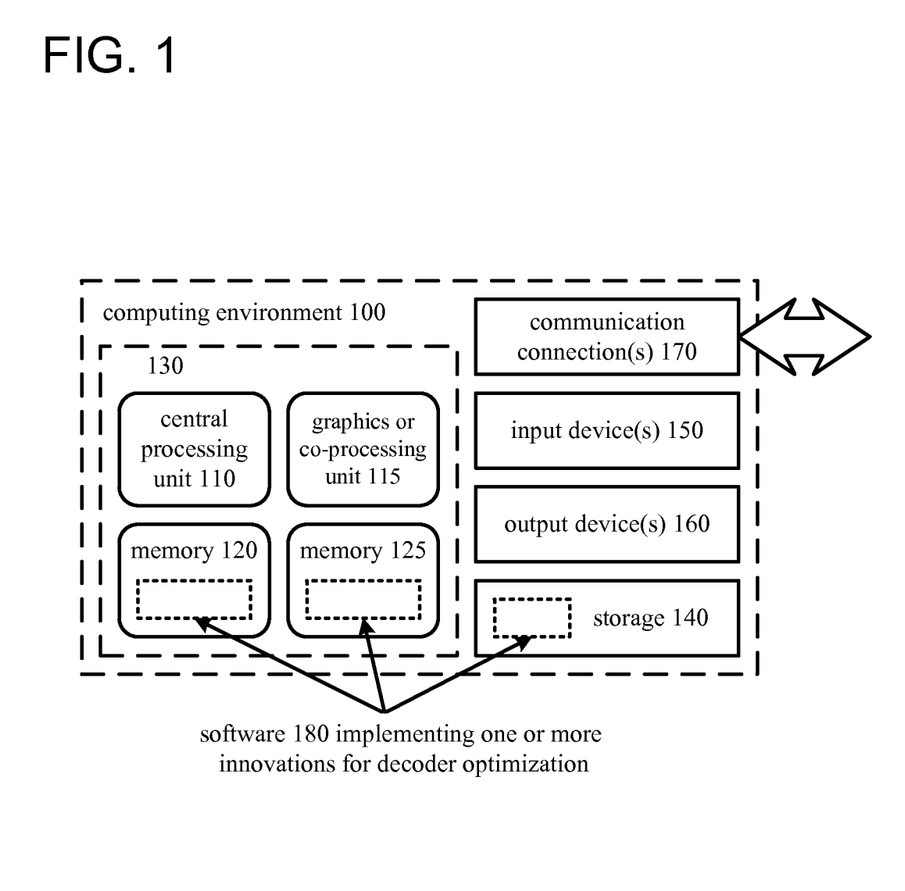
FIG. 1 is a diagram of an example computing environment in which some described embodiments can be implemented.

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes one or more processing units (110, 115) and memory (120, 125) that can be used in implementing a computing device. In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for decoder optimization, in the form of computer-executable instructions suitable for execution by the processing unit(s).

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing environment (100). The storage (140) can store instructions for the software (180) implementing one or more innovations for decoder optimization.

The input device(s) (150) may be a touch input device such as a keyboard, mouse, pen, or trackball, a voice input device, a scanning device, or another device that provides input to the computing environment (100). For video decoding, the input device(s) (150) may be a video card, TV tuner card, or similar device that accepts video input in analog or digital form, or a CD-ROM or CD-RW that reads video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment (100), computer-readable media include memory (120), storage (140), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

II. Overview of Metadata Assisted Decoding Optimization

Figure 2:
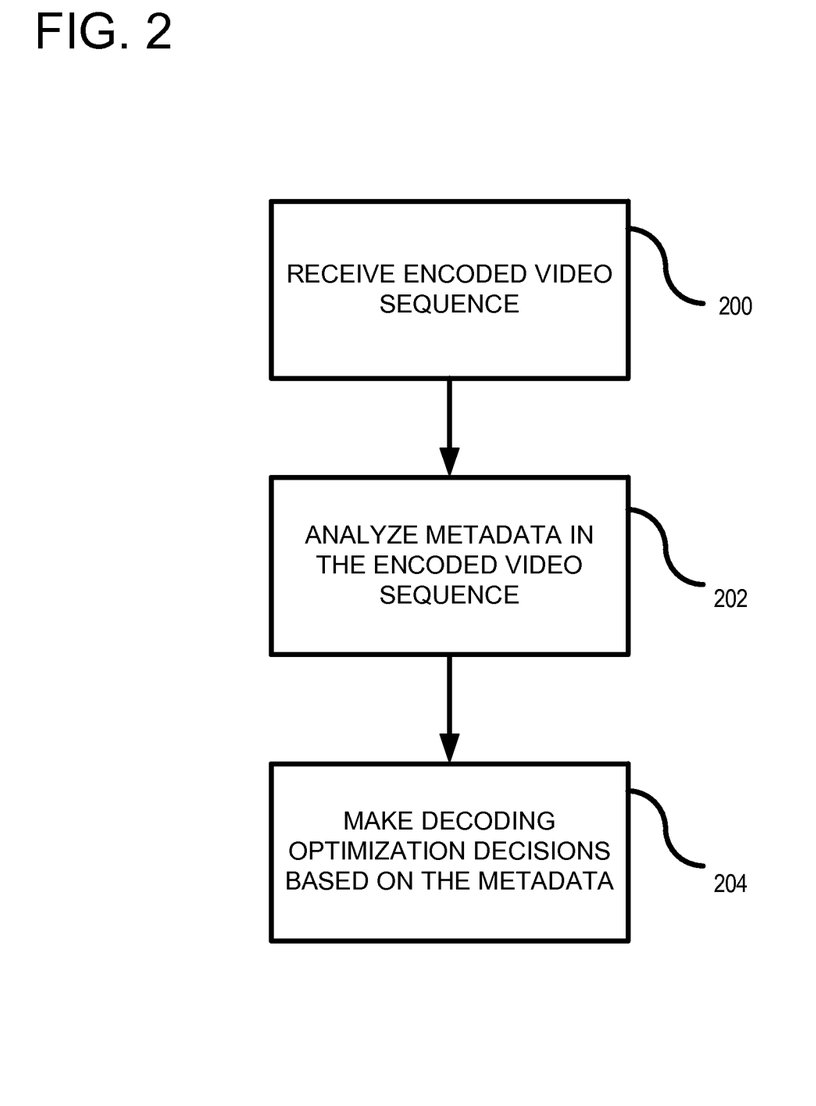
FIG. 2 is a flowchart of a method for making decoding optimization decisions based on metadata in an encoded video sequence.

FIG. 2 is a flowchart of a method for using metadata to optimize decoding. In process block 200, an encoded video sequence is received. The encoded video sequence can be a movie clip or other video sequence and can use any of a variety of container formats including MPEG-X, AVI, MKV, ASF, etc. Additionally, any variety of standards for video compression can be used, such as H.264/AVC, VC-1, MPEG-4 Pt2, etc. In process block 202, metadata in the encoded video sequence can be analyzed in order to make decoding decisions. The metadata can be any that is used to assist in describing or classifying the raw image data of the video sequence. For example, a Sample Description Box (STSD) can be used in MPEG-4 to obtain metadata regarding parameter sets, such as the sequence parameter set (SPS) and picture parameter set (PPS). The parameter sets can contain additional information regarding arbitrary slice ordering (ASO) and flexible macroblock ordering (FMO) that can be used to make decoder optimization decisions (process block 204). For example, using the metadata, a choice can be made to forward the encoded data to the most efficient decoder engine. In other examples, metadata can be used to optimize bitstream parsing, as further described below. Other metadata can be used, and the embodiments described herein are not limited to the particular metadata used and the particular decoder optimization decisions.

III. Decoder Engine Selection Using Metadata

Figure 3:
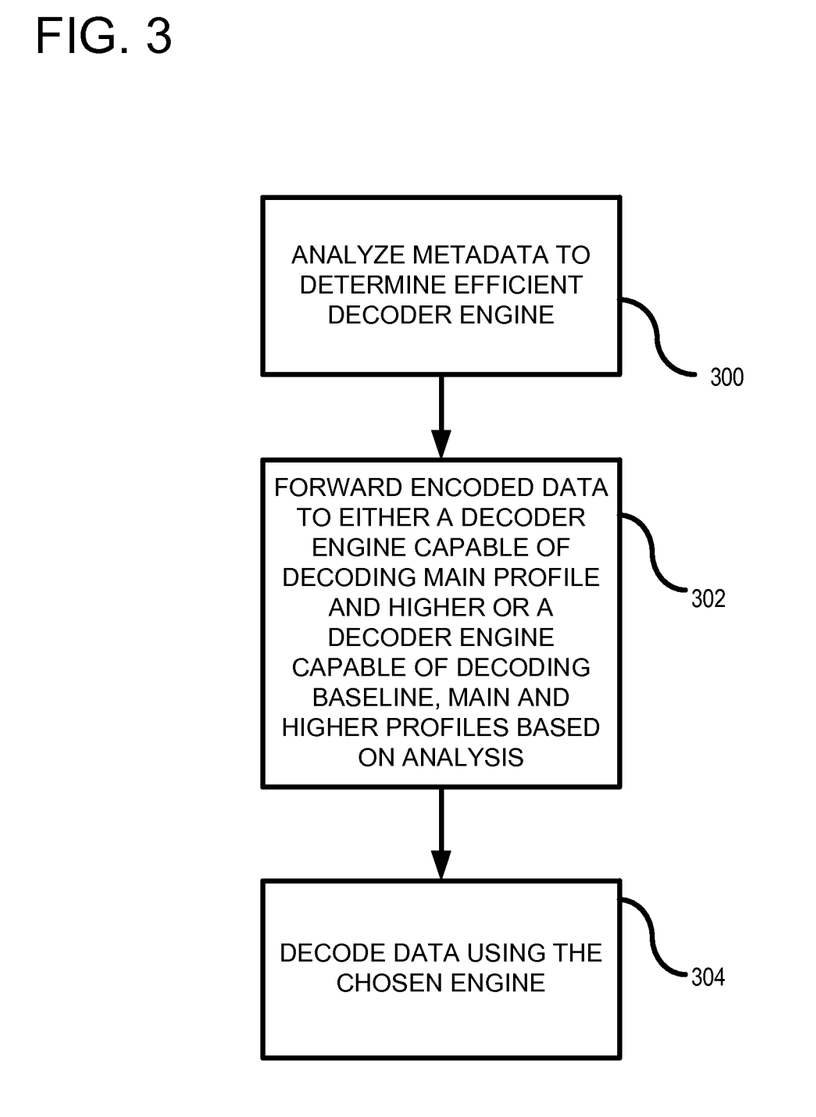
FIG. 3 is a flowchart of using the metadata to determine which available decoder engine can be used to decode the video sequence.

FIG. 3 is an example embodiment showing additional details or process blocks used in conjunction with FIG. 2. In process block 300, metadata can be analyzed to determine a most efficient decoder engine. An efficient decoder engine can be one that performs the decoding in the least amount of time, for example. Other efficiency parameters can also be analyzed, such as memory usage, accuracy, etc. In process block 302, the decoder can include a plurality (e.g., two or more) decoder engines and, as a result of the analysis, the encoded data can be forwarded to the appropriate decoder engine. A first decoder engine type can be a decoder engine capable of decoding main profile or bitstreams at higher profiles. Typically, decoder engines such as GPUs fall into this group, or other processors that perform a portion of the decoding in specialized hardware designed for decoding (generally called hardware acceleration). A second decoder engine type can be capable of decoding baseline, main and higher profiles. A central processing unit (CPU) that decodes using software is an exemplary second decoder engine type. In general, CPUs have generalized hardware that can be used for purposes other than decoding and, as a result, can be less efficient. In process block 304, the chosen decoder engine decodes the encoded data. The decoded data can then be used for displaying the decoded video, such as on a user display.

Figure 4:
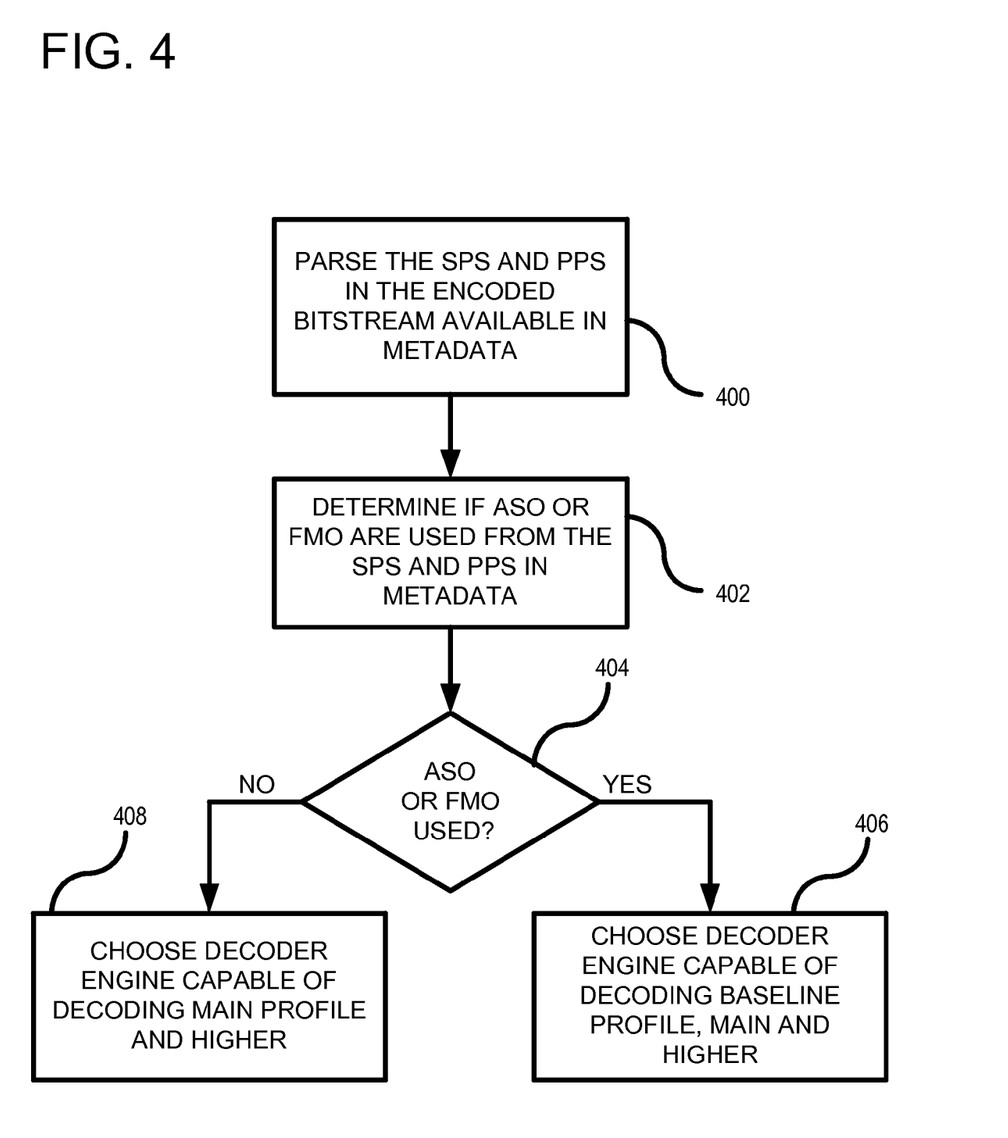
FIG. 4 is a more detailed flowchart that can be used to expand on the flowchart of FIG. 3 and is a particular example for an MPEG-4 video sequence.

FIG. 4 is a flowchart of a method expanding on process block 300 using a specific example of MPEG-4. In process block 400, parameter sets, such as SPS and PPS in the encoded bitstream metadata can be parsed. In process block 402 and decision block 404, a determination can be made whether ASO or FMO are used by analyzing the SPS and PPS metadata. If so, then a decoder engine that is capable of decoding baseline profile, main and higher is chosen, such as a CPU that decodes the bitstream using software (process block 406). Otherwise, in process block 408, a decoder engine is chosen that is capable of decoding main profile and higher, such as a GPU or other hardware accelerated decoding engine.

Figure 5:
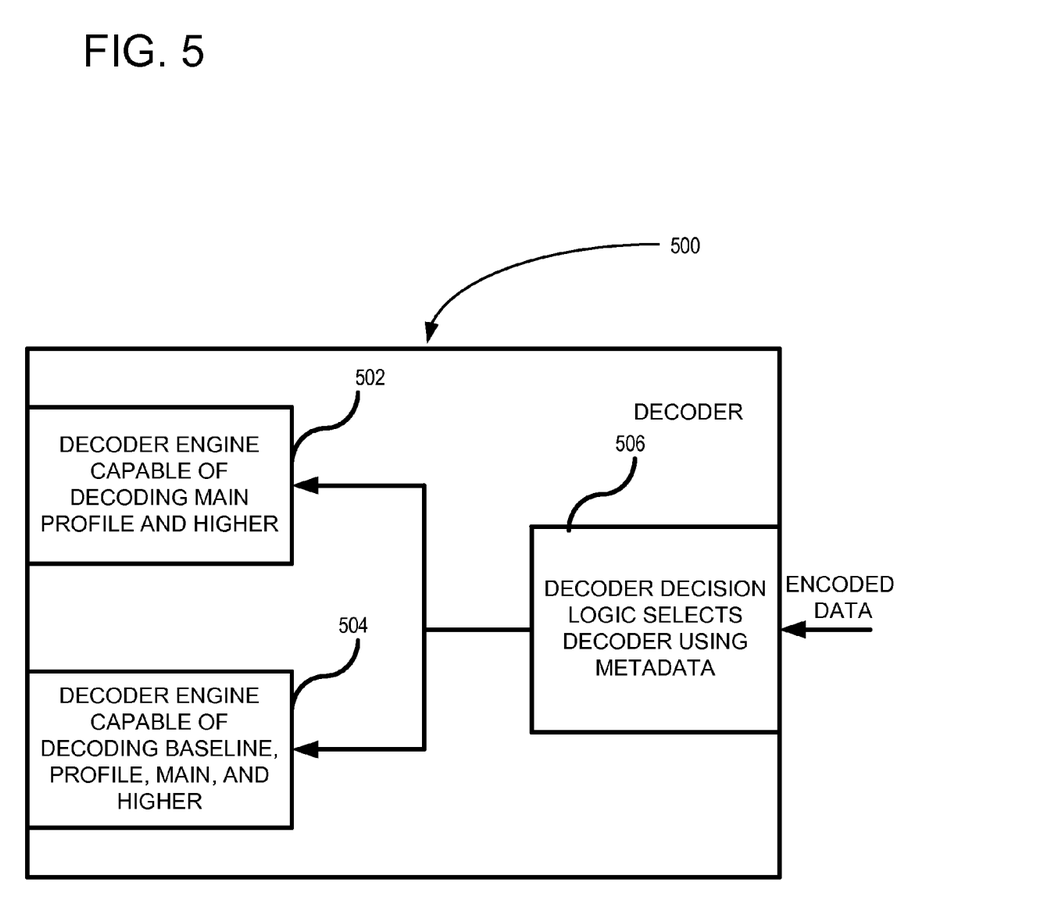
FIG. 5 is an example architectural structure of a decoder including multiple decoder engines.

FIG. 5 shows a high-level diagram of a decoder 500 including multiple decoder engines 502, 504 that can be used. Decoder engine 502 is capable of decoding main profile and higher encoded data, and is generally not capable of or is inefficient at decoding baseline profiles. Thus, the decoder engine 502 is less desirable to use when the data is encoded using certain types of algorithms, such as ASO and FMO. The decoder engine 504 is a decoder engine capable of decoding baseline profile, main and higher. Thus, the decoder engine 504 can decode a wider variety of encoded data types than the decoder engine 502. At 506, decoder decision logic selects which decoder engine 502, 504 can decode the received encoded data based on metadata in the bitstream using algorithms described herein.

Thus, if metadata from MPEG-4 file format is available, hardware accelerated video decoding can still be done for clips, even if flags are improperly set in the encoded bitstream. For example, if there is single 'stsd' sample entry from MPEG-4 file format in the clip, which is often true, all the SPS's and PPS's can be sent in the very beginning of bitstream decoding. Even after an H.264 decoder parses the SPS's and finds the bitstream is in baseline profile, not compatible with main profile, an H.264/AVC decoder could parse all PPS's and find out whether the bitstream really uses FMO and ASO. If not, which is often true, the bitstream can still be sent to hardware accelerator for video decoding. Basically, using the additional meta data information from MPEG-4 file format, it could go one step further and look into all PPS's and then decide whether it shall use hardware accelerated video decoding or not for a given clip.

IV. Exemplary Video Decoder Engine

Figure 6:
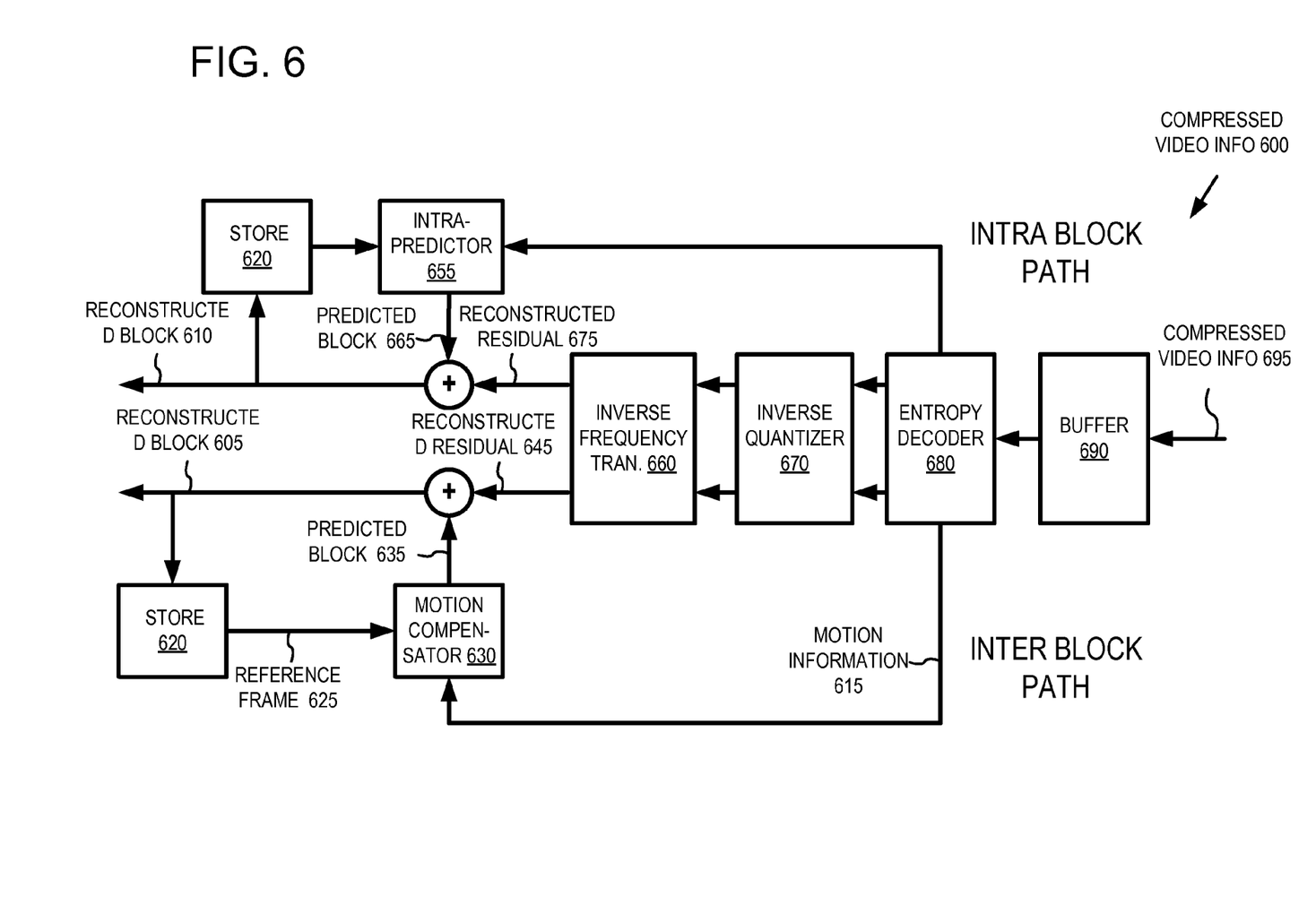
FIG. 6 is an example decoder engine that can be used.

FIG. 6 is a schematic diagram of a general video decoder engine 600 that can perform decoding using any of the embodiments described herein. Alternative decoder engines can be used, and FIG. 6 is merely an example. The decoder engine 600 receives information 695 for a compressed sequence of video frames (e.g., via a compressed video bitstream) and produces output including a reconstructed block 605. Particular embodiments of video decoders can use a variation or supplemented version of the generalized decoder 600.

The decoder engine 600 decompresses blocks coded using inter-prediction and/or intra-prediction. For the sake of presentation, FIG. 6 shows a path for intra-coded blocks through the decoder engine 600 (shown as the intra block path) and a path for inter-coded blocks (shown as the inter block path). Many of the components of the decoder engine 600 are used for decompressing both inter-coded and intra-coded blocks. The exact operations performed by those components can vary depending on the type of information being decompressed.

A buffer 690 receives the information 695 for the compressed video sequence and makes the received information available to the entropy decoder 680. The buffer 690 typically receives the information at a rate that is fairly constant over time. The buffer 690 can include a playback buffer and other buffers as well. Alternatively, the buffer 690 receives information at a varying rate.

The entropy decoder 680 entropy decodes entropy-coded quantized data as well as entropy-coded side information (e.g., motion information 615, flags, modes, syntax elements, and other side information), typically applying the inverse of the entropy encoding performed in the encoder. For example, the entropy decoder 680 can use any of the disclosed counter-based variable length coding techniques described below to perform decoding (e.g., decoding of syntax elements). An inverse quantizer 670 inverse quantizes entropy-decoded data. An inverse frequency transformer 660 converts the quantized, frequency domain data into spatial domain video information by applying an inverse transform such as an inverse frequency transform.

If the block 605 to be reconstructed is an inter-coded block using forward-prediction, a motion compensator 630 applies motion information 615 (e.g., predicted motion information) to a reference frame 625 to form a prediction 635 of the block 605 being reconstructed. A buffer (store) 620 stores previous reconstructed frames for use as reference frames. Alternatively, a motion compensator applies other types of motion compensation. The prediction by the motion compensator is rarely perfect, so the decoder 600 also reconstructs a prediction residual 645 to be added to the prediction 635 to reconstruct block 605.

When the decoder needs a reconstructed frame for subsequent motion compensation, the store 620 buffers the reconstructed frame for use in predicting a subsequent frame. In some implementations of predicting a frame, the frame is predicted on a block-by-block basis (as illustrated) and respective blocks of the frame can be predicted. One or more of the predicted blocks can be predicted using motion information from blocks in the same frame or one or more blocks of a different frame.

If the block 605 to be reconstructed is an intra-coded block, an intra-predictor 655 forms a prediction 665 of the block 610 being reconstructed. The buffer (store) 620 stores previous reconstructed blocks and frames. The prediction by the motion compensator is rarely perfect, so the decoder 600 can also reconstruct a prediction residual 675 to be added to the prediction 665 to reconstruct block 610.

Although a particular decoder engine is described, a wide variety of decoder structures can be used, as the type of decoder engine is a matter of design choice, and depends on the particular application.

V. Optimized Bitstream Parsers Using Metadata

Figure 7:
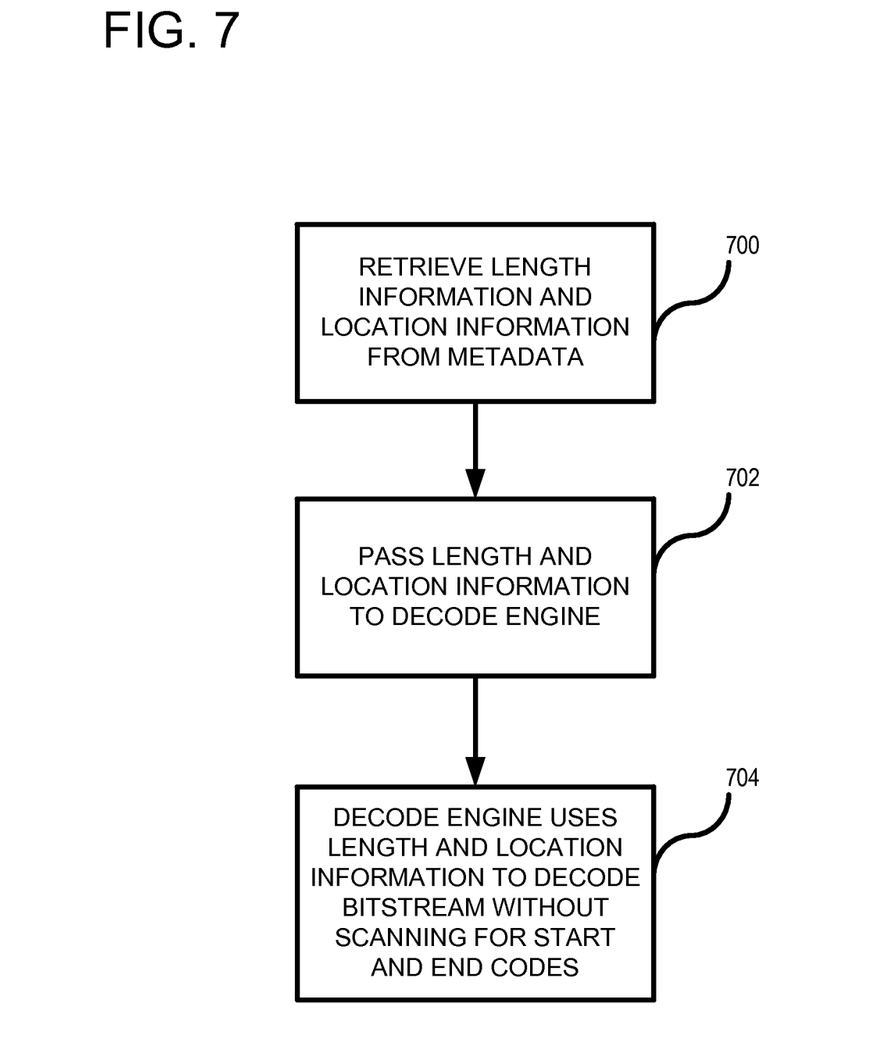
FIG. 7 is a flowchart of a method for passing length and location to a decoder engine.

FIG. 7 is a flowchart of a method for implementing decoder optimization using metadata. For purposes of illustration, the flowchart of FIG. 7 is described in relation to an H.264/AVC decoder. However, it is generally understood that the method can apply to other decoder types. In general, H.264/AVC decoder accepts a bitstream, with start code 0x00 00 001 in the beginning of each network access layer unit (NALU). MPEG-4 file format indicates the length of each network access layer unit and sends one picture per sample to H.264/AVC decoder. When the NALU length information is available, hardware accelerated decoding can completely skip start code scanning, and send NALU's one by one directly to hardware.

In process block 700, decoder decision logic (such as shown at 506, FIG. 5), retrieves length and location information associated with the NALU. Such information is metadata and can be found in the file container associated with the incoming bitstream. In process block 702, the length and location information is passed to the appropriate decoder engine that was selected, as previously described. Alternatively, the method can be applied to decoders having a single decode engine. In process block 704, the decoder engine can use the length and location metadata information to decode the bitstream without scanning for start codes. The location information describes the position in the bitstream wherein the data starts. The length information provides where the data ends, relative to the start. Substantial savings in CPU cycles is achieved by eliminating the need for start-code scanning because the location and length information is already provided.

Figure 8:
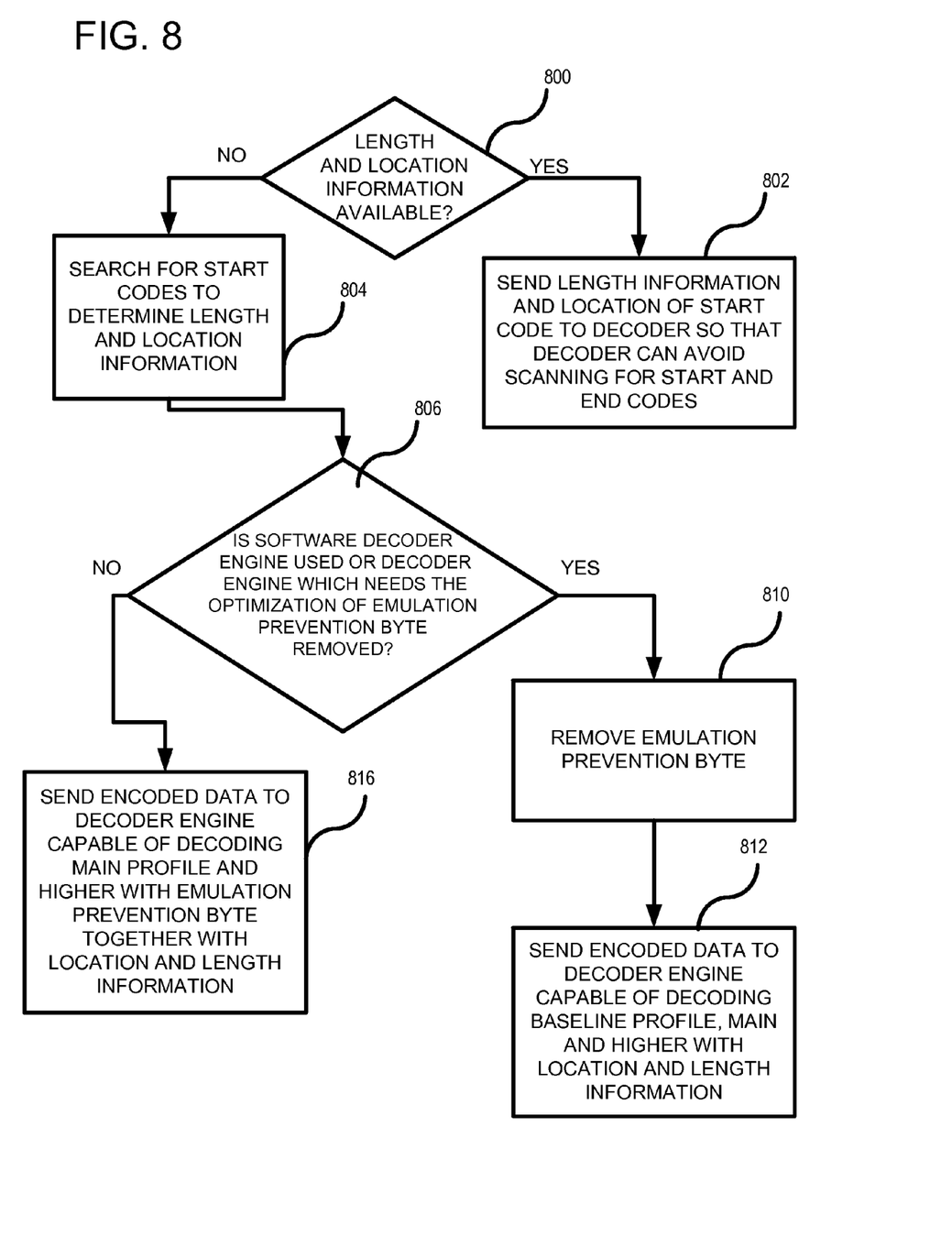
FIG. 8 is a flowchart of a method for removing an emulation prevention byte.

FIG. 8 shows an embodiment of an additional method wherein an emulation prevention byte is analyzed. Software decoding of H.264/AVC videos can remove emulation prevention byte 0x03 in the compressed bitstream to achieve efficient entropy decoding. That is, it can be more efficient for software CABAC/CAVLC decoding not to detect an emulation prevention byte in the process of entropy decoding. The bitstream parser in software decoding is designed to perform start code parsing and emulation prevention byte removal at substantially the same time. On the other hand, hardware accelerator decoding sometimes does not need to remove emulation prevention 0x03 from a compressed bitstream. A different bitstream parser can be designed to scan start code only, detect and remove emulation prevention byte 0x03 in flight (dynamically) while the bitstream parser decodes slice headers, sequence parameter set (SPS), picture parameter set (PPS), and supplemental enhancement information (SEI).

In decision block 800, a determination is made whether length and location information are available in metadata. If yes, then in process block 802, the length and location of the start code are passed to the appropriate decoder engine so that the decoder can avoid start-code scanning. If not, then the start codes are searched so that length and location information can be determined (process block 804). The searching can be performed by scanning the bit stream and comparing each byte to a start code to find the location. The length can be determined by searching for an end code and counting the bytes between the start and end codes. In decision block 806, a determination is made if a software decoder engine (e.g., CPU) is used or a decoder engine which needs optimization by removal of the emulation prevention byte. If either of these decoder engines is used, then in process block 810, the emulation prevention byte is removed from the bitstream. In process block 812, the encoded data with the emulation prevention byte removed is sent to the decoder engine, which is capable of decoding baseline profile, main and higher. The length and location information can also be sent to the decoder. If decision block 806 is answered in the negative, then in process block 816, the encoded data is sent to the decoder capable of decoding main profile and higher with the emulation prevention byte together with the length and location information. Thus, when the NALU length information is available, hardware accelerated decoding can completely skip start code scanning, and send NALU's one by one directly to hardware. The optimized bitstream parser achieves a substantial gain in CPU usage, especially for hardware accelerated video decoding on low-end machines.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. In a computing device that implements a video decoder, a method comprising:
   receiving an encoded video sequence with a file container;
   by the video decoder, detecting a flag within the video sequence indicating that a decoder engine is required that is capable of decoding a baseline profile;
   with the computing device that implements the video decoder, analyzing metadata associated with the encoded video sequence in the file container;
   based on the metadata indicating that the decoder engine that is capable of decoding a baseline profile is not required, determining that the flag is improperly set; and
   using the metadata to make decoder optimization decisions in the video decoder, the decoder optimization decisions including selecting a decoder that is not capable of decoding a baseline profile in accordance with the metadata and ignoring that the flag is set.

2. The method of claim 1, wherein the decoder optimization decisions include choosing a decoder engine, based on the metadata, to perform the decoding from a plurality of decoder engines.

3. The method of claim 2, wherein the plurality of decoder engines are chosen from a list including of one of the following: a decoder engine capable of decoding a video sequence of main profile and higher profiles and a decoder engine capable of decoding baseline, main and higher profiles.

4. The method of claim 3, wherein the decoder engine capable of decoding a video sequence of main profile and higher profiles includes a graphics processing unit for hardware acceleration and the decoder engine capable of decoding baseline, main and higher profiles includes a central processing unit.

5. The method of claim 1, further including searching the metadata for a type of algorithm used in the encoding and choosing a decoding engine based on the type of algorithm.

6. The method of claim 5, wherein the types of algorithms include arbitrary slice ordering (ASO) and flexible macroblock ordering (FMO).

7. The method of claim 5, wherein searching the metadata includes parsing the one or more parameter sets in the encoded video sequence.

8. The method of claim 1, further including retrieving length information and location information associated with the encoded video sequence and passing the length and location information to a decoder engine as the metadata.

9. The method of claim 1, wherein analyzing the metadata further includes scanning the encoded video sequence for at least one start code and end code and calculating length information based on the at least one start and end codes.

10. The method of claim 9, further including removing an emulation prevention byte from the metadata before passing the encoded video sequence to the decoder engine.

11. The method of claim 1, wherein the decoder optimization decision includes suppressing start-code scanning based on the metadata.

12. A computer-readable nonvolatile storage device having encoded therein computer-executable instructions for causing a computing device programmed thereby to perform a method comprising:
receiving an encoded video sequence in a decoder, the encoded video sequence including a flag indicating use of a decoder engine capable of decoding a baseline profile;
analyzing metadata in the encoded video sequence to determine which of at least two decoder engines would be more efficient, the metadata indicating use of a decoder engine that is not capable of decoding a baseline profile, which indication is opposite to that which the flag indicated; and
forwarding the encoded video sequence to the determined decoder engine based on the metadata, wherein the determined decoder engine is not capable of decoding a baseline profile.

13. The computer-readable nonvolatile storage device of claim 12, wherein the plurality of decoder engines are one of the following: a decoder engine capable of decoding a video sequence of main profile and higher profiles and a decoder engine capable of decoding baseline, main and higher profiles.

14. The computer-readable nonvolatile storage device of claim 13, wherein the decoder engine capable of decoding a video sequence of main profile and higher profiles includes a graphics processing unit for hardware acceleration and the decoder engine capable of decoding baseline, main and higher profiles includes a central processing unit.

15. The computer-readable nonvolatile storage device of claim 12, further including searching the metadata for a type of algorithm used in the encoding and choosing a decoding engine based on the type of algorithm.

16. The computer-readable nonvolatile storage device of claim 15, wherein the types of algorithms include arbitrary slice ordering (ASO) and flexible macroblock ordering (FMO) and if either of these algorithms are used then choosing the decoder engine that is capable of decoding baseline, main and higher profiles.

17. The computer-readable nonvolatile storage device of claim 15, wherein searching the metadata includes parsing the one or more parameter sets in the encoded video sequence.

18. A computing device that implements a video decoder, the computing device comprising one or more processing units and being adapted to perform a method comprising:
receiving encoded data in a bitstream for a video sequence, wherein the bitstream includes one or more parameter sets included in metadata, the one or more parameter sets including information indicating that a decoder engine is required capable of decoding a video sequence with a baseline profile;
parsing the one or more parameter sets to determine whether arbitrary slice ordering or flexible macroblock ordering are used;
if arbitrary slice ordering or flexible macroblock ordering are used, forwarding the encoded data to a first decoder engine capable of decoding a video sequence of baseline, main and higher profiles;
if the arbitrary slice ordering or flexible macroblock ordering are not used, forwarding the encoded data to a second decoder engine, different than the first decoder engine, capable of decoding main profile and higher profiles, but not a baseline profile, irrespective of the one or more parameter sets including information indicating that a decoder engine is required that is capable of decoding a video sequence with a baseline profile.

19. The computing device of claim 18, further including suppressing start-code scanning based on the metadata.

20. The computing device of claim 18, further including removing an emulation prevention byte from the metadata.

\* \* \* \* \*